UNITED STATES PATENT OFFICE.

CLAUS SPRECKELS, OF SAN FRANCISCO, CALIFORNIA.

IMPROVEMENT IN PROCESSES OF MANUFACTURING HARD SUGAR.

Specification forming part of Letters Patent No. 153,626, dated July 28, 1874; application filed January 6, 1874.

*To all whom it may concern:*

Be it known that I, CLAUS SPRECKELS, of the city and county of San Francisco and State of California, have invented an Improvement in the Process of Manufacturing Hard Sugar, of which the following is a specification:

When sugar has been drained and cleansed of its sirup in the centrifugal machine, by water, it cannot be molded, pressed, and dried into hard sugar, but it becomes what is known as granulated sugar—its crystals being detached from each other.

To make its crystals or grains adhere to each other, so as to be molded, pressed, and dried into hard sugar, the practice has heretofore been to cleanse or wash it with white liquor—sirup made of white sugar—instead of water. Sufficient of the liquor will remain in the sugar to give it the requisite adhesiveness. But this mode of cleansing with white liquor is much more expensive than doing it with water.

My invention consists in using water to do the cleansing, and white liquor to give the necessary adhesiveness. I have discovered that after the sugar has been washed by water, the addition of a little white liquor will secure the same effect as if the entire cleansing had been effected by white liquor.

The only special direction necessary is this: After a machine-full of sugar has been washed with water, in the same manner as for granulated sugar, the requisite quantity of white liquor to make the sugar adhesive is poured into the machine, and at the same time the power is turned off and the brake applied, and the motion so regulated that the liquor shall be well distributed through the sugar, but none, or but very little of it, be discharged therefrom. The liquor should be at about 32° Baumé, and about one quart to a hundred pounds of sugar.

Instead of using white liquor, glucose or any like substance, capable of giving the necessary adhesiveness, may be used.

After this treatment, the sugar can be taken out of the machine, and molded, pressed, and dried, in the same manner and with like effect as if it had been cleansed with white liquor.

Instead of making the mixture in the centrifugal machine, it may be made in any other manner which will do it well.

I do not, of course, claim the cleansing of sugar with water, white liquor, glucose, or other equivalent; but—

Having thus described my invention, what I claim as new, and desire to secure by Letters Patent, is—

In the manufacture of loaf-sugar, the process of cleansing the granulated sugar with water, and subsequently mixing the thus cleansed sugar with white liquor, glucose, or other equivalent substance, in about the proportion stated, substantially as specified.

Witness my hand this 29th day of December, 1873.

CLAUS SPRECKELS.

Witnesses:
ALFRED RIX,
JOHN M. BEATH.